Dec. 8, 1964 M. G. ANDERSON 3,160,191
SAFETY TIRE HAVING AN INNER TIRE PROVIDED WITH A CHAFE
AND PUNCTURE RESISTING TREAD
Filed Sept. 11, 1962 2 Sheets-Sheet 1

INVENTOR.
MALCOLM G. ANDERSON
BY
J.B. Holden
ATTORNEY

Dec. 8, 1964    M. G. ANDERSON    3,160,191
SAFETY TIRE HAVING AN INNER TIRE PROVIDED WITH A CHAFE
AND PUNCTURE RESISTING TREAD
Filed Sept. 11, 1962    2 Sheets-Sheet 2

INVENTOR.
MALCOLM G. ANDERSON
BY
J.B. Holden
ATTORNEY

United States Patent Office 3,160,191
Patented Dec. 8, 1964

3,160,191
SAFETY TIRE HAVING AN INNER TIRE PROVIDED WITH A CHAFE AND PUNCTURE RESISTING TREAD
Malcolm G. Anderson, Hudson, Ohio, assignor to The Goodyear Tire & Rubber Company, Akron, Ohio, a corporation of Ohio
Filed Sept. 11, 1962, Ser. No. 222,850
4 Claims. (Cl. 152—341)

The present invention relates to a safety tire of the class in which a tubeless tire is mounted on a rim to form an annular air space divided by means of a transverse safety wall into radially disposed inner and outer chambers. The present invention relates to the construction of the safety wall which forms at least a part of the inner chamber and must carry the load when the outer chamber is deflated.

One object of the present invention is to provide on such a wall a substantially deep tread designed to encompass puncturing objects that pass through the tubeless tire and to hold the puncturing objects away from the dividing wall to prevent or minimize puncturing of said wall;

Another object of this invention is to provide a tread which is of substantial depth and perforated substantially throughout its entire circumference with relatively large size perforations separated from adjacent perforations by relatively thin, substantially uniform walls providing circumferential and lateral flexibility to the tread whereby, in run-flat operation the engaging surfaces of the tread on the wall and the inner surface of the tubeless tire may move in unison or substantially so due to such flexibility, and thus eliminate lubrication between these surfaces or reduce the amount of lubrication required to prevent excessive abrasion of the engaging surfaces;

Another object of this invention is to provide a tread having a series of perforations extending substantially through the tread in a generally radial direction and with the perforations provided at their innermost ends with metal cups or other relatively hard material to resist penetration of the dividing wall of the inner tire by puncturing objects in the tubeless tire.

Other objects and advantages of this invention will become apparent hereinafter as the description thereof proceeds, the novel features, arrangements and combinations being clearly pointed out in the specification as well as in the claims thereunto appended.

The prior art teaches the use of various types of safety tires employing essentially a non-stretchable or only slightly stretchable inner tire mounted within a tubeless tire to form a dividing wall and thus form an inner chamber defined by the rim and inner tire and an outer chamber defined by the inner and outer tires. Specifically, this invention relates to tires of the class intended to permit the operator to continue the operation of the vehicle for a great distance after the tubeless tire has failed. Since there may be puncturing objects in the tubeless tire, that may puncture the inner tire especially under emergency operation, it is a primary object of this invention to provide a tread on the inner tire of such configuration that it will prevent contact between most puncturing objects and the inner tire wall without interfering with the smooth operation of the inner tire when running on the inner wall of the tubeless tire.

When the outer chamber fails, the tubeless tire flattens out until it is engaged by the inner tire. Under this condition the respective engaging areas do not move at the same linear speed thereby causing abrasion of the inner tire and outer tire, which action may cause a further failure. Some such safety tires provide lubricant to overcome this differential rate of speed to thus reduce abrasion. The present invention relates to a tread for the inner tire that is flexible in both a circumferential and a lateral direction so that the tread on the inner tire, when in contact with the inner wall of the outer tire, will move at, or substantially at, the same linear speed to reduce, if not entirely eliminate, the need for a lubricant. The invention contemplates use of such a lubricant.

While the invention will be described primarily in connection with specific types of safety tires, it is to be understood that it may be used with other safety tires of this type. The constructions of the inner tire disclosed herein are shown merely by way of example.

Figure 1:
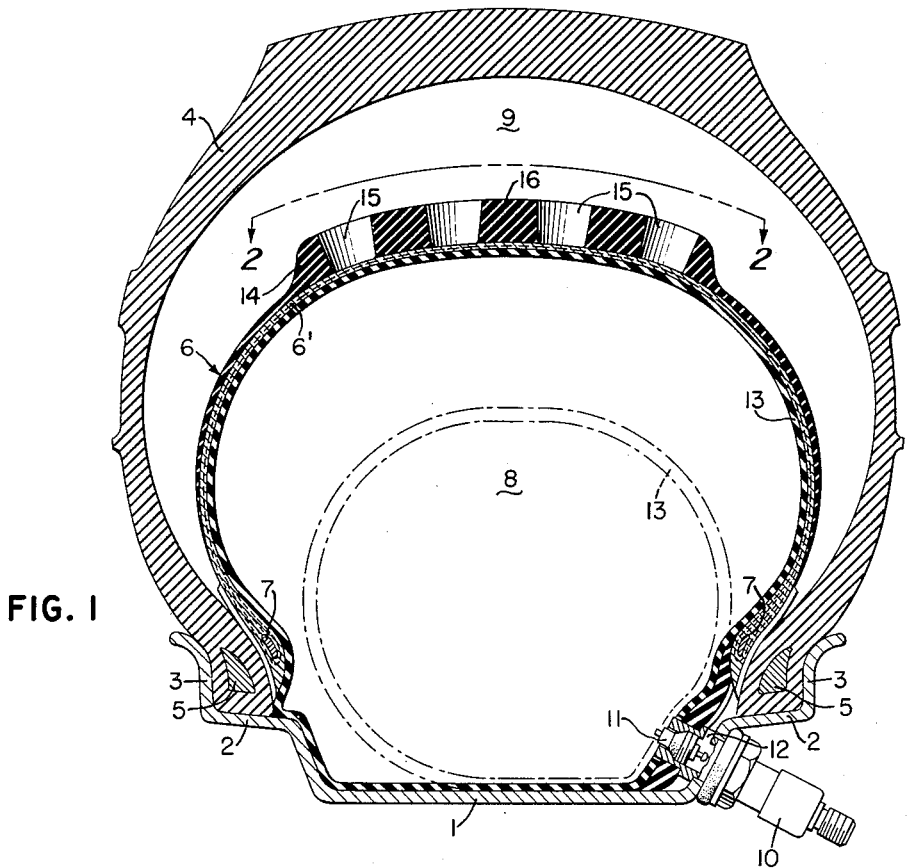
FIG. 1 is a transverse cross-section through a tire and rim assembly embodying the invention.

FIG. 1 shows a drop-center rim 1 having bead seats 2 and retaining flanges 3 on which may be mounted a tubeless tire 4 with its beaded edges 5 engaging the aforesaid bead seats and side flanges 3 to form an annular air space. The inner tire 6 comprises a layer 6' of rubberized fabric which is substantially inextensible and this is provided with inner beaded edges 7 to form an inner tire similar to the outer tubeless tire 4. The inner tire forms a dividing wall between the rim 1 and the tubeless tire 4 to form an inner chamber 8 and an outer chamber 9.

A valve 10 mounted on the rim 1 is used for inflating chambers 8 and 9. As shown, the inner end of the stem of valve 10 is provided with a check valve 11, which opens under the inflation pressure to allow air to enter the inner tube 13. A metering opening 12 in the stem restricts flow of air to the outer chamber sufficiently to insure a faster build-up of pressure in chamber 8 than in chamber 9. The pressure in the inner chamber should be sufficiently in excess of that in the outer chamber to hold the beads 7 of the inner tire firmly against the beads of the tubeless tire to give stability to the inner tire and to prevent shifting of the beads 7 with respect to the tubeless tire beads 5.

As shown in dotted lines, the cross-section of the inner tube 13 is substantially less than the cross-section of the chamber 8 and on inflation the inner tube expands to fill the chamber 8. There is a definite reason for using a tube of small cross-section. For air retention purposes it is only necessary to use a rather thin-walled inner tube because, except for emergency operation, the inner tire remains inactive. Manufacturing methods make it difficult to construct a very thin inner tube and thus conserve material, but conservation of material can be obtained by making a smaller but thicker inner tube that may be readily manufactured and then inflated to fill the inner tire, thus reducing the tube thickness. The smaller tube also makes mounting easier.

Figure 2:
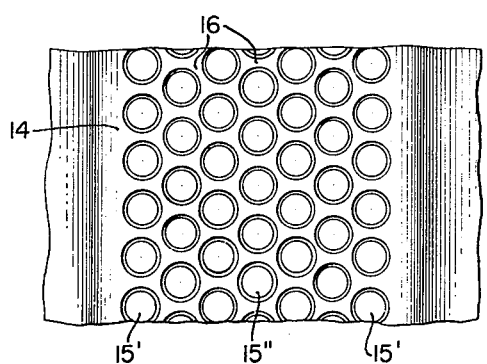
FIG. 2 is a plan view of the tread portion of the inner tire looking in the direction of the line 2—2 in FIG. 1.

The outer surface of the inner tire 6 is provided with a tread 14 having relatively large and deep perforations 15 in its outer surface and these extend to or substantially to the layer of rubberized fabric 6. These perforaions are separated by relatively thin radial partition walls 6 tapered outwardly at their lower edges to give greater stability to the partition walls to carry the load and yet provide sufficient flexibility at the outer circumference of the tread 14 to permit their movement with the inner wall of the tubeless tire when operating under emergency conditions. In order to preserve a preferable uniformity of spacing between the perforations, both circumferentially and transversely, the perforations in successive rows outwardly toward the lateral edges of the tread are made progressively smaller in diameter than those at the center of the tread since the diameter at the tread surface toward said edges decreases toward said edges. Thus, in FIG. 2, perforations 15' at the outer edges will be of a smaller diameter than the perforation 15" at the center. It has been found that with perforations approximating ½" to ⅝" in diameter, the radial walls between adjacent perforations at their closest points should approximate 1/16" to ⅛". Such a thickness for the intermediate wall will give sufficient load-bearing surface under emergency operation to hold the wall of the inner tire spaced from the inner wall of the tubeless tire without substantial reduction in the tread thickness.

Another purpose in having the perforations provided in the tread 14 is to reduce the weight of the inner tire without decreasing efficiency for the purposes required. The perforations in the tread also serve another purpose and that is they provide a space into which puncturing objects may protrude without damaging the useful tread area of the inner tire. A solid tread, if used, not only would be objectionable insofar as weight is concerned, but it also would cause some destruction of the tubeless tire and of the tread area itself in case a puncturing object extending through the tubeless tire penetrated the tread of the inner tire. Perhaps the best way to explain this is that if the puncturing object that extends through the outer tire also penetrates the inner tire tread under run-flat operation, this puncturing object tends to lock the meeting surfaces of the two tires together. Consequently, during rotation of the tires under run-flat conditions, where the engaging surfaces must move relative to each other as explained above, the puncturing object would tend to be worked around to different angular positions and thus tend to enlarge the hole in the outer casing as well as tend to destroy or break down the tread on the inner tire.

Figure 3:
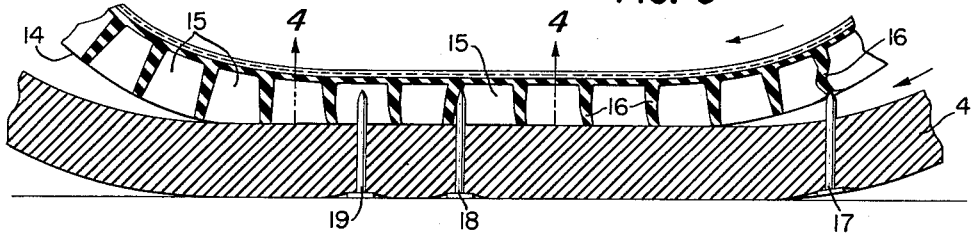
FIG. 3 is a fragmentary cross-sectional view taken at right angles to the axis of rotation of the tire illustrating run-flat operation.
Figure 4:
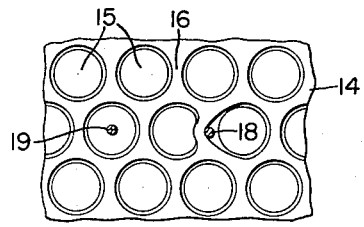
FIG. 4 is a section taken along the line 4—4 of FIG. 3.

With the present invention, however, it will be noted in FIGS. 3 and 4 that when a nail, such as 17, extending through the tire 4, engages the radial wall 16 between the perforations, it will tend to bend this wall, as shown, and then slip to one side or the other of the wall instead of perforating the wall. It may push the wall 16 to one side as indicated with the nail 18 but damage to the wall is avoided or minimized. Obviously, a nail 19 or other puncturing object so located that it enters a perforation centrally as shown in FIG. 3, will not engage the walls of the perforation.

Note also in FIG. 3 there is a somewhat diagrammatic illustration of how the radial walls 16 tend to be deflected by the engagement of these walls with the tire 4. These have sufficient flexibility that when the tread engages the inner surface of the tire 4, the tread tends to move at the same speed as the inner circumference of the flattened portion of the tread of the tire 4. As is well understood in the tire art, when the tire engages the road surface, as shown in FIG. 3, the tread in the area engaging flat surface changes its linear speed and causes relative movement between it and the tread on the inner tire. This causes relative movement circumferentially between the inner tire and the outer tire under run-flat conditions and there is also a similar relative movement in a lateral direction when going around a curve. Thus, by providing a flexible tread that permits circumferential and lateral movement of the outer portion of the tread on the inner tire, abrasion is reduced between the inner tire and outer tire to such an extent that lubricant may not be necessary or the amount of lubricant required could be minimized. If a lubricant is used, it should be a stable type not compatible with the rubber of the tread.

Figure 6:
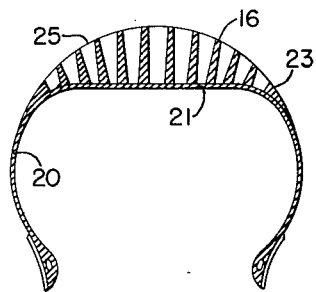

It has been found from actual experience that in most cases the puncturing objects picked up by the road-engaging tire do not protrude inwardly of the inner wall of the tire more than about ⅜" to ½". By experience with puncturing objects it has been determined that a tread ½" deep will probably prevent most puncturing objects from engaging the inner wall of the inner tire. Obviously, it may still be possible for a puncturing object to engage and pierce the dividing wall and cause a failure of the inner tire, but the effect would be primarily that of a slow leak and would probably not occur with any great frequency. It is, nevertheless, a possibility. The depth of this tread, however, could be increased, if found to be desirable. One way of doing this is shown in FIG. 6 in which the inner wall 20 is flattened out, as at 21, and the depth of the tread section at the center thereof is deeper for the same circumferential dimension and contour of the tread. Also, it will be noted in this construction that while volume of the air in the inner chamber 3 is less than in a construction shown in FIG. 1, the outer circumference of the inner tire is approximately the same and thus the deflection of the tubeless tire under run-flat conditions would be substantially the same with both constructions.

Figure 5:
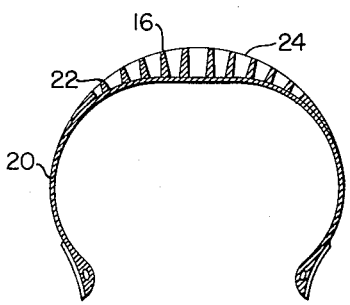
FIGS. 5 and 6 are cross-sections showing modifications of the tread for the inner tire.

Note that in FIGS. 5 and 6 the lateral edges 22 and 23 of the treads 24 and 25, respectively, are curved to meet smoothly with the side walls of the inner tire and thus avoid the relatively abrupt shoulder on the tread shown in FIG. 1. This further reduces the chafing between the tread of the inner tire and the inner wall of the tubeless tire under run-flat conditions. The rather smooth contour of the tread, as shown in FIGS. 5 and 6, is preferred.

The cross-sectional shape of the perforations in a circumferential direction is not of major importance—the important feature is the flexibility of the dividing walls and their design to give sufficient stability to carry the load and flex sufficiently for the purposes described. For example, the perforations could be hexagonal or oval in cross-section.

Figures 7, 8:
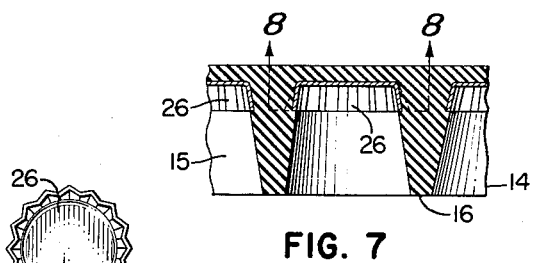
FIG. 7 is a fragmentary cross-sectional view of a further modified construction for the tread.
FIG. 8 is a plan view of the metal cup looking in the direction 8—8 in FIG. 7.

In order to prevent penetration of the diaphragm if the puncturing object is sufficiently long to pass into engagement with the wall 6, the perforations may be provided with a metal cup-shaped insert, such as 26, positioned in the tread as shown in FIG. 7. These inserts may be molded in the tread or inserted in the perforations later. These cup-shaped members have radially extending flanges abutting or preferably embedded in the walls of the perforations with portions of the rubber in the walls of the perforations overlying the flanges. These flanges may be conical and crimped as shown in FIG. 8.

Instead of using the metal cups, such as shown in FIG. 7, it would be possible to further reinforce the wall by a layer of tougher rubber; use an outer layer of wire fabric beneath the tread, or build the wire fabric into the wall.

Figure 9:
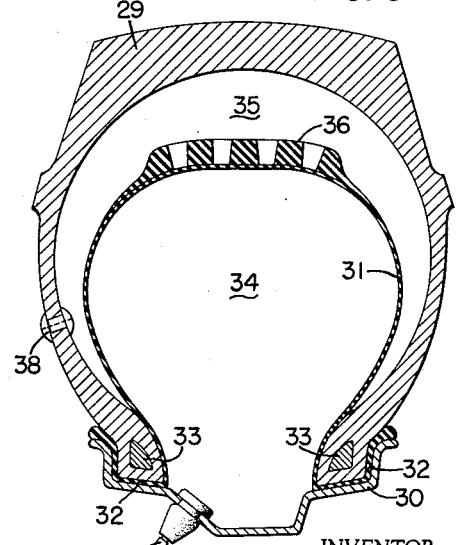
FIG. 9 is a cross-section similar to FIG. 1 showing the invention embodied in a different safety tire construction.

In FIG. 9, for the sake of illustration, there is indicated a different type of safety tire in which the tubeless tire 29 is mounted on a rim 30, as in FIG. 1, and in which an inner diaphragm 31 having channel-shaped edges 32, encompassing the beads 33, are mounted on the bead seats of the rim to provide inner and outer chambers 34 and 35 respectively. The tread 36 is similar to the tread in FIG. 1, but the chambers instead of being inflated by means of a single valve are inflated by using an ordinary "snap-in" type rim valve 37 for inflating the inner chamber and a valve 38 mounted in the side wall of the tire 29 to inflate the outer chamber 35.

While certain representative embodiments and details have been shown for the purpose of illustrating the invention, it will be apparent to those skilled in the art that various changes and modifications may be made therein without departing from the spirit or scope of the invention.

Having thus fully described my invention what I claim and desire to secure by Letters Patent of the United States is:

1. An inner safety tire for use within the space defined by an outer tire mounted on a rim, comprising a thin substantially inextensible and readily flexible circumferential outer dividing wall of substantially uniform thickness at the outer circumference thereof and having a circumference such that the dividing wall will be spaced a substantial distance from the inner circumference of said outer tire and said rim when said inner tire is mounted in said space to thus divide said space defined by said outer tire and rim into radially disposed inner and outer air chambers, said dividing wall having on its outer circumference a tread of substantial thickness at least adjacent the circumferential centerline thereof and having an outer circumference substantially less than that of the inner circumferential wall of the outer tire, said tread comprising a plurality of relatively narrow, generally radially extending interconnected partition walls defining closely spaced perforations of a cross-section substantially greater than the thickness of the partition walls between the perforations and of a depth substantially the full thickness of the tread, said partition walls being flexible at least at their radial outermost portions to permit lateral and circumferential flexing thereof when engaging the inner circumferential wall of said outer tire after deflation of the outer chamber, to thus permit the partition walls, when in engagement with the inner wall of the outer tire, to move therewith and thus reduce the amount of relative movement therebetween and thus minimize the abrasion of the engaging surfaces of said partition walls and outer tire, said partition walls being adapted to hold the inner circumferential surface of the outer tire in substantial spaced relation to the dividing wall when the outer chamber is deflated.

2. A safety tire as set forth in claim 1 in which said perforations are distributed substantially uniformly circumferentially and laterally of said tread.

3. A safety tire as defined in claim 1 in which metal cup-shaped members, having substantially flat bottoms and upstanding flanges at the edges thereof, are arranged in said perforations with said bottoms thereof at the outer surface of said dividing wall and with the flanges abutting the sidewalls of their respective perforations for a radial distance substantially less than the radial extent of said wall.

4. A safety tire as set forth in claim 3 in which said flanges of said cup-shaped members are embedded in the lateral walls of said perforations with portions of the walls overlying the outer edges of the flanges.

References Cited in the file of this patent

UNITED STATES PATENTS

| | | |
|---|---|---|
| 1,829,483 | Hibbert | Oct. 27, 1931 |
| 1,860,362 | Jones | May 31, 1932 |
| 2,198,008 | Iknayan | Apr. 23, 1940 |
| 2,375,127 | Mendelsohn | May 1, 1945 |
| 3,025,902 | Sanderson | Mar. 20, 1962 |

FOREIGN PATENTS

| | | |
|---|---|---|
| 3,739 | Denmark | Feb. 15, 1901 |